United States Patent [19]
Juarez

[11] Patent Number: 5,863,593
[45] Date of Patent: Jan. 26, 1999

[54] PROCESS FOR DEHYDRATING TUBERS IN ORDER TO OBTAIN A STORABLE IMPERISHABLE FOOD PRODUCT, AND FOOD PRODUCT THUS OBTAINED

[75] Inventor: Francisco Camacho Juarez, Aravaca, Spain

[73] Assignee: Macalfa, S.L., Madrid, Spain

[21] Appl. No.: 809,088

[22] Filed: May 13, 1997

[30] Foreign Application Priority Data

Jul. 11, 1995 [ES] Spain ...................................... 9501388
Nov. 17, 1995 [WO] WIPO ...................... PCT/ES95/00129

[51] Int. Cl.⁶ .............................. A23L 1/216; A23L 1/28; A23B 4/03
[52] U.S. Cl. .......................... 426/637; 426/640; 426/427; 426/465; 426/473
[58] Field of Search ................................... 426/637, 640, 426/429, 465, 473

[56] References Cited

U.S. PATENT DOCUMENTS

| | | | |
|---|---|---|---|
| 4,504,504 | 3/1985 | Gaehring et al. | 426/321 |
| 5,312,631 | 5/1994 | Yamashita | 426/52 |
| 5,324,534 | 6/1994 | Stevens et al. | 426/637 |
| 5,484,616 | 1/1996 | Vellucci, Jr. et al. | 426/242 |

*Primary Examiner*—Nina Bhat
*Attorney, Agent, or Firm*—Klauber & Jackson

[57] ABSTRACT

Process for dehydrating tubers in order to obtain a storable imperishable food product, and a food product thus obtained. The process comprises the removal of the skin from the raw tubers; selecting the final content of starch which should be contained in the food product; determining the initial percentage of starch in the raw tubers; selecting the final content of starch which should be contained in the food product; determining the initial percentage of starch in the raw tubers; optionally cutting the tubes in slices; immersing the tubers in a solution of sodium hypochlorite or acetic acid or ethyl alcohol; and exposing the tubers to a drying process by applying a hot air flow. The food product obtained by the process has a water content of 10–30% by weight.

16 Claims, No Drawings

PROCESS FOR DEHYDRATING TUBERS IN ORDER TO OBTAIN A STORABLE IMPERISHABLE FOOD PRODUCT, AND FOOD PRODUCT THUS OBTAINED

TECHNICAL FIELD OF THE INVENTION

The invention refers to a process for dehydrating tubers in order to obtain a storable and essentially imperishable food product for long periods of time, as well as a product based on dehydrated tubers.

PRIOR ART OF THE INVENTION

Tubers, rhizomes outgrown from plants with a high content of starch such as potatoes, sweet potatoes, maniocs., Ipomea batatas, etc. are traditionally and presently a very important part of the human and animal diet, as energy suppliers. Given the seasonalness of the crops of a large part of tubers, their preservation is of great interest.

Hence, conventionally harvested tubers have been kept in dry environments protected against exposure to sunlight, for the purpose of preventing their rotting and germination. However, this type of preservation implies, on the one hand, the need to have large surface areas for storage and, on the other hand, the fact that the goods cannot be stored for more than one or two years during which the same gradually spoil until they become waste products.

There are also fried products, such as potato chips, fried in oil or grease that, vacuum-packed, may be stored for relatively long periods of time, although, essentially based on degradation by oxidation of the oil or of the fat that impregnate this type of product, a loss of the organoleptic quality of these products and the development of unpleasant tasting or even toxic substances tends to be produced.

On the other hand, with the advancement of vacuum-packaging techniques, tubers such as potatoes or sweet potatoes are presently precooked and vacuum-packed which also permits a relatively long storage although the goods thus preserved spoil slowly.

Other preservation techniques are based on ultrafreezing of the whole or cut up tubers, which has the inconvenience that their storage results to be very costly for the construction, maintenance and operation of the freezing chambers that are needed.

Finally, there are products such as, for example, potato flakes, coming from finely cut up, mashed and dehydrated potatoes, rehydratable in order to obtain mashed potatoes, that may be stored for long periods of time without them substantially losing their organoleptic qualities. The disadvantage of this type of product mainly consists of the fact that they can only be consumed as mashed potatoes and they are not usable for other types of human foods.

In order to solve this last problem, in other words, in order to obtain a product comprised of dehydrated tubers whose structure and other organoleptic qualities were, after rehydration thereof, the most similar as possible to fresh potatoes, research has been done. However, neither products nor processes that are feasible on an industrial level have been found.

Basically, the problem in the dehydration of tubers consists of the starch that they contain. As it is known, tubers such as potatoes, sweet potatoes, maniocs, Ipomea batatas, etc. contain around 75 to 85% by weight of water and 15 to 20% by weight of starch. With regard to the starch in tubers, it is essentially comprised of two macromolecules, namely, from 16 to 35% of amylose with a molecular weight comprised between 17,000 and 225,000 and soluble in water, and from 64 to 85% of amylopectin with a molecular weight of 200,000 to 1,000,000 and insoluble in water. The starch has great hydrolization ability, therefore the tubers offer a large resistance to dehydration, especially when heat dehydration processes are involved, which, according to conventional methods, implied the formation of a saccharide layer or film on the outside of the tubers, impermeable to evapotranspiration of the water contained inside the tubers, which lead to internal "cooking" of the tubers.

An attempt has been made to solve this inconvenience by reacting and removing from the tuber, one of the starch macromolecules, the water soluble amylose. However, this implies that the other part of the starch, comprised essentially of amylopectin, remains inside the tuber grouped in stable concentrations, and that gives it some very unpleasant organoleptic characteristics which made the marketing thereof as a human food product unfeasible.

Aside from the above mentioned inconveniences of the "preserved" products comprised of tubers, the high content of starch of the tubers results in a very high energy supply to the human diet, considered to be excessive for the diets of a large number of consumers.

Fresh tubers or tubers conserved by means of vacuum-pack techniques with or without precooking, also have the inconvenience that, in view of the high water content of the tubers and the weight and resulting volume, their transport and storage turn out to be expensive.

OBJECT OF THE INVENTION

The object of the present invention is to solve the above described inconveniences by means of an industrially feasible process that permits vehiculization of the amylopectin outside the inside of the tuber, in order to obtain a dehydrated food product with excellent organoleptic qualities and with a form that allows it to be added to a large number of dishes in which tubers are conventionally present.

DETAILED DESCRIPTION OF THE INVENTION

The invention refers to a process for dehydrating raw tubers, such as potatoes, sweet potatoes, maniocs, Ipomea batatas, etc., in order to obtain a food product with a water content of 10 to 30% by weight, whose process essentially comprises the steps of:

(a) removing the skin from the raw tubers essentially dirt free;

(b) selecting the final content of starch and water that should be contained in the final food product;

(c) determining the initial percentages of starch and water in the raw tubers; optionally cutting the tubers in slices of a specific thickness;

(d) determining the thickness of the peeled tubers, optionally cut in slices;

(e) immersing the tubers in a solution of 2.5 to 8.0% (v/v) of an extracting agent capable of oxidizing amylopectin, for a period of time corresponding to the time in minutes corresponding to the number resulting from subtracting from said initial percentage of starch said final percentage of starch;

(f) eliminating at least one part of the extracting agent solution by drip-drying;

(g) exposing the drip-dried tubers to a dehydration process by applying a hot air flow in a suitable drying device, in accordance with a program, calculated in terms of a thickness of 1.5 mm, which comprises the following steps:
- (g1) applying a hot air flow that has an initial temperature of 114° to 143° C. for 12 to 17 minutes;
- (g2) lowering the temperature at a velocity or rate expressed as °C. per minute of between 1.7° and 2.3° C. per minute until a temperature between 45° to 92° C. is reached; raising the temperature to 73° to 97° C.;
- (g3) lowering the temperature at a velocity of 0.9° to 1.1° C. per minute until a temperature of 55° to 75° C. is reached;
- (g4) raising, per each 0.5 mm of thickness of the tubers or of the slices of tubers the period of remaining at said initial temperature by 5 minutes, and
- (g5) raising the initial temperature from 4.5° to 5.5° C. which is lowered just once to 114° to 143° C. before starting step (g2) in which the temperature is lowered at a velocity of 1.7° to 2.3° C. per minute; and
- (g6) keeping the relative humidity of the air flow below 35% but above the percentage of water desired in the final food product.

In this way, a dehydrated food product with a water content of 10 to 30% by weight which, once rehydrated, has some pleasant organoleptic qualities practically identical to those of the raw tuber, is obtained. Besides, upon having partially removed the starch (around 60%), a product lower in calories than the raw tuber, which makes it especially beneficial for consumers, is obtained. Given that the product resulting from the process does not have a notably hygroscopic character and is not susceptible to oxidation at room temperature, it is storable for long periods of time without loss of its organoleptic qualities. The proportions of the two macromolecules that comprise the starch present in the final product basically correspond to the proportions in the fresh tuber.

On the other hand, the extracted starch can be used as a starting product for other food products, feed, or even other industrial type products that contain starch.

Another one of the advantages of the process according to the invention, is that it may be done entirely in conventional installations and by means of conventional means.

The extracting agent solution is used as a reagent in the extraction to start breakage of the macromolecular chain of the amylopectin in such a way that, upon subjecting the tuber treated in this way to dehydration in a hot air flow, the layer of "caramelized" sugars is not formed on the surface of the tuber or of the cut up tuber, nor is there grouping in stable concentrations, that is to say, evapotranspiration of the tuber remains possible.

Amylopectin is an avid oxygen grabbing compound, therefore, the extracting agent must be capable of oxidizing the amylopectin in order to be able to start the breakage of its macromolecular chain. For example, suitable agents are low concentration solutions of sodium hypochlorite, acetic acid, ethyl alcohol, citric acid, muriatic acid, glacial acetic acid or nitrous acid apt for human consumption.

The first step (=g1) of the program of applying the hot air flow, in other words, applying a hot air flow at a temperature between 114° and 143° C. (raised by 4.5° to 5.5° C. per 0.5 mm of additional thickness to 1.5 mm of the piece) for 12 to 17 minutes (increased by 5 minutes per 0.5 mm of thickness of the additional piece to 1.5 mm, as it is necessary to produce the breakage reaction of the macromolecule of amylopectin during dehydration, while the subsequent steps serve to maintain the breakage reaction of the amylopectin chain, thus avoiding the formation of the above mentioned layers that would prevent evapo-transpiration, and therefore, dehydration.

Conveniently, the velocity of the air flow in the conventional drying tunnel or stove is adjusted in such a way that, per each 100 kg. of tuber a volume of 0.5 $m^3$ is provided for and a velocity of air flow of 25 $m^3$ per minute is applied when the maximum water content of the raw tubers is lower than or equal to 80% by weight. Preferably, per each additional 1% of water in the raw tubers, the velocity of air flow is increased 1 $m^3$ per minute.

Ideal tubers for human consumption are, for example, potatoes, sweet potatoes, maniocs and Ipomea batatas. Among them, the potato is the tuber used the most for human consumption in Europe and in North America.

Conveniently, the largest tubers are cut in pieces or slices to make their dehydration easier. However, when it is a question of small tubers, such as the so-called French fries of a very small volume, they may be dehydrated without the need of previously cutting them.

Rehydration merely consists of immersing the final product in water until enough water (approximately eight times its own weight) has been absorbed so as to acquire a consistency practically equal to that of a raw tuber.

EMBODIMENTS OF THE INVENTION

Some practically embodiments of the invention based on the following general conditions will be described hereinafter:

100 kg. of potatoes are peeled in a conventional peeling machine and washed with water and cut in slices with a specific thickness. The content of water and of starch desired in the product resulting from the dehydration process is established. By means of a conventional ABBA saccharimeter the content of starch is established in terms of representative samples as well as the thickness of the pieces.

The pieces are introduced in a 200 liter volume basket and the basket is introduced in a vessel that contains 250 liters of an extracting agent solution, according to one of the following three alternatives sodium hypochlorite 5%;

acetic acid 4%;

ethyl alcohol 7%

EXAMPLE 1

In the above described general conditions, the potatoes are cut in 1.5 mm thick slices. The average content of water and of starch of the pieces is 79% by weight of water and 18% by weight of starch, respectively.

It is determined that the percentage by weight of water and of starch that is to be obtained in the final product is 12% of water and 10% of starch, respectively.

The slices are immersed in the sodium hypochlorite solution for 8 minutes, after which they are left to drip-dry and they are introduced in a conventional stove with a volume of 0.5 $m^3$, provided with a hot air flow system and that permits the adjustment of the relative humidity of the air flow between 30% and 13% and the velocity of the air flow is adjusted to 25 $m^3$ per minute.

The pieces are kept in the stove according to the following program:

15 minutes at 135° C.;

30 minutes during which the temperature is lowered from 135° C. to 75° C. at a velocity of −2° C. per minute;

10 minutes during which the temperature is raised to 85° C. at a velocity of 1° C. per minute;

20 minutes during which the temperature is lowered to 65° C. at a velocity of −1° C. per minute.

Then the dehydrated pieces are removed from the stove and left to cool at room temperature to obtain a packageable product.

EXAMPLE 2

Under the above described general conditions, the potatoes are cut in 2.5 mm thick slices. The average content of water and of starch is 82% by weight of water and 15% by weight of starch, respectively.

It is determined that the percentage by weight of water and of starch that is to be obtained in the final product is 11% of water and 10% of starch, respectively.

The slices are immersed in the sodium hypochlorite solution for 5 minutes, after which they are left to drip-dry and they are introduced in a conventional stove with a volume of 0.5 m$^3$, provided with a hot air flow system and that permits the adjustment of the relative humidity of the air flow between 30% and 13% and the velocity of the air flow is adjusted to 27 m$^3$ per minute.

The pieces are kept in the stove according to the following program:

25 minutes at 145° C.;

1 minute during which the temperature is lowered from 145° C. to 135° C.;

30 minutes during which the temperature is lowered from 135° C. to 75° C. at a velocity of −2° C. per minute;

10 minutes during which the temperature is raised to 85° C. at a velocity of 1° C. per minute.

20 minutes during which the temperature is lowered to 65° C. at a velocity of −1° C. per minute.

Then the dehydrated pieces are removed from the stove and left to cool at room temperature to obtain a packageable product.

EXAMPLE 3

Under the above described general conditions, the potatoes are cut in 1.5 mm thick slices. The average content of water and of starch is 79% by weight of water and 18% by weight of starch, respectively.

It is determined that the percentage by weight of water and of starch that is to be obtained in the final product is 11% of water and 10% of starch, respectively.

The slices are immersed in the sodium hypochlorite solution for 8 minutes, after which they are left to drip-dry and they are introduced in a conventional stove with a volume of 0.5 m$^3$, provided with a hot air flow system and that permits the adjustment of the relative humidity of the air flow between 30% and 12% and the velocity of the air flow is adjusted to 25 m$^3$ per minute.

The pieces are kept in the stove according to the following program:

15 minutes at 120° C.;

approximately 41 minutes during which the temperature is lowered from 120° C. to 50° C. at a velocity of 2° C. per minute;

20 minutes during which the temperature is raised to 80° C. at a velocity of 1.5° C. per minute;

20 minutes during which the temperature is lowered to 60° C. at a velocity of −1° C. per minute.

Then the dehydrated pieces are removed from the stove and left to cool at room temperature to obtain a packageable product.

EXAMPLE 4

Under the above described general conditions, the potatoes are cut in 2.5 mm thick slices. The average content of water and of starch is 82% by weight of water and 15% by weight of starch, respectively.

It is determined that the percentage by weight of water and of starch that is to be obtained in the final product is 11% of water and 10% of starch, respectively.

The slices are immersed in the sodium hypochlorite solution for 5 minutes, after which they are left to drip-dry and they are introduced in a conventional stove with a volume of 0.5 m$^3$, provided with a hot air flow system and that permits the adjustment of the relative humidity of the air flow between 30% and 13% and the velocity of the air flow is adjusted to 27 m$^3$ per minute.

The pieces are kept in the stove according to the following program:

25 minutes at 150° C.;

1 minute during which the temperature is lowered from 150° C. to 140° C.;

30 minutes during which the temperature is lowered from 140° C. to 71° C. at a velocity of −2.1° C. per minute;

10 minutes during which the temperature is raised to 81° C. at a velocity of 1° C. per minute;

20 minutes during which the temperature is lowered to 60° C. at a velocity of −1° C. per minute.

Then the dehydrated pieces are removed from the stove and left to cool at room temperature to obtain a packageable product.

EXAMPLE 5

Under the above described general conditions, the potatoes are cut in 1.5 mm thick slices. The average content of water and of starch is 79% by weight of water and 18% by weight of starch, respectively, It is determined that the percentage by weight of water and of starch that is to be obtained in the final product is 12% of water and 10% of starch, respectively.

The slices are immersed in the acetic acid solution for 8 minutes, after which they are left to drip-dry and they are introduced in a conventional stove with a volume of 0.5 m$^3$, provided with a hot air flow system and that permits the adjustment of the relative humidity of the air flow between 30% and 13% and the velocity of the air flow is adjusted to 25 m$^3$ per minute.

The pieces are kept in the stove according to the following program:

15 minutes at 135° C.;

30 minutes during which the temperature is lowered from 135° C. to 75° C. at a velocity of −2° C. per minute;

10 minutes during which the temperature is raised to 85° C. at a velocity of 1° C. per minute;

20 minutes during which the temperature is lowered to 65° C. at a velocity of −1° C. per minute.

Then the dehydrated pieces are removed from the stove and left to cool at room temperature to obtain a packageable product.

EXAMPLE 6

Under the above described general conditions, the potatoes are cut in 2.5 mm thick slices. The average content water and of starch is 82% by weight of water and 15% by weight of starch, respectively.

It is determined that the percentage by weight of water and of starch that is to be obtained in the final product is 11% of water and 10% of starch, respectively.

The slices are immersed in the ethyl alcohol solution for 5 minutes, after which they are left to drip-dry and they are introduced in a conventional stove with a volume of 0.5 m$^3$, provided with a hot air flow system and that permits the adjustment of the relative humidity of the air flow between 30% and 13% and the velocity of the air flow is adjusted to 27 m$^3$ per minute.

The pieces are kept in the stove according to the following program:

25 minutes at 145° C.;

1 minute during which the temperature is lowered from 145° C. to 135° C.;

30 minutes during which the temperature is lowered from 135° C. to 75° C. at a velocity of –2° C. per minute;

10 minutes during which the temperature is raised to 85° C. at a velocity of 1° C. per minute;

20 minutes during which the temperate is lowered to 65° C. at a velocity of –1° C. per minute.

Then the dehydrated pieces are removed from the stove and left to cool at room temperature to obtain a packageable product.

Obviously, the above indicated examples may be equally applied to other tubers such as sweet potatoes, maniocs and Ipomea batatas.

I claim:

1. A process for dehydrating raw tubers in order to obtain a final food product with a water content between 10 and 30% by weight, and a final starch content the process essentially comprises the steps of:

(a) removing the skin from the raw tubers essentially dirt free;

(c) determining the initial percentages of starch and water in the raw tubers; optionally cutting the tubers in slices of a specific thickness;

(d) determining the thickness of the peeled tubers, optionally cut in slices;

(e) immersing the tubers in a solution of 2.5 to 8.0% (v/v) of an extracting agent apt for human consumption and capable of oxidizing amylopectin, for a period of time corresponding to the time in minutes corresponding to the number resulting from subtracting from said initial percentage of starch said final percentage of starch;

(f) eliminating at least one part of the extracting agent solution by drip-drying;

(g) exposing the drip-dried tubers to a dehydration process by applying a hot air flow in a suitable drying device, in accordance with a program, calculated in terms of a thickness of 1.5 mm, which comprises the following steps:

(g1) applying a hot air flow that has an initial temperature of 114 ° to 143° C. for 12 to 17 minutes;

(g2) lowering said temperature at a rate of between 1.7° and 2.3° C. per minute until a temperature between 45° to 92° C. is reached; raising the temperature to 73° to 97° C.;

(g3) lowering the temperature at a rate of 0.9° to 1.1° C. per minute until a temperature of 55° to 75° C. is reached;

(g4) raising, per each 0.5 mm of thickness of the tubers or of the slices of tubers the period of remaining at said initial temperature by 5 minutes, and (g5) raising the initial temperature from 4.5° to 5.5° C. which is lowered just once to 114° to 143° C. before starting step (g2) in which the temperature is lowered at a velocity of 1.7° to 2.3° C. per minute; and (g6) keeping the relative humidity of the air flow below 35% but above the percentage of water desired in the final food product to obtain the dehydrated food product.

2. Process according to claim 1, wherein the extracting agent solution is selected from the group consisting of sodium hypochlorite, acetic acid, ethyl alcohol, citric acid, muriatic acid, glacial acetic acid and nitrous acid.

3. Process according to claim 2, wherein the concentration the sodium hypochlorite solution is of 5.5%.

4. Process according to claim 1, wherein the initial temperature is from 130° to 140° C. that is applied for 15 minutes.

5. Process according to claim 4, wherein the initial temperature is 135° C.

6. Process according to claim 1, wherein the initial temperature is lowered at a rate of 2° C. per minute until a temperature of 70°–80° C. is reached.

7. Process according to claim 6, wherein the initial temperature is lowered at a rate of 2° C. per minute until a temperature of 75° C. is reached.

8. Process according to claim 7, wherein, after lowering the initial temperature, the temperature is raised from 85° C. at a rate of 1° C. per minute.

9. Process according to claim 1, wherein after the increase that follows the lowering of the initial temperature, the temperature is lowered at a rate of 1.0° C. per minute until a temperature of 60°–70° C. is reached.

10. Process according to claim 9, wherein the temperature is lowered until a temperature of 65° C. is reached.

11. Process according to claim 1, wherein, per 0.5 mm of thickness additional to a thickness of 1.5 mm of the tuber optionally cut, the period remaining at said initial temperature is increased by 5 minutes, and the initial temperature is raised 5.0° C. which is lowered once to 65° C. before starting the step in which the temperature is lowered at a rate of 1.7° to 2.3° C. per minute.

12. Process according to claim 1, wherein the tuber is selected from the group consisting of potatoes, sweet potatoes, maniocs and Ipomea batatas.

13. Process according to claim 1, wherein the concentration of the solution of acetic acid in water is 3 to 4%.

14. Process according to claim 1, wherein the concentration of the solution of ethyl alcohol in water is 7 to 8%.

15. Process according to claim 1, wherein the concentration of the solution of sodium hypochlorite in water is 5 to 6%.

16. Dehydrated food product according to the process defined in any of the above claims that comprises between 10 and 15% by weight of water and between 40 and 60% less starch than the raw tuber.

* * * * *

UNITED STATES PATENT AND TRADEMARK OFFICE
CERTIFICATE OF CORRECTION

PATENT NO.  : 5,863,593
DATED       : January 26, 1999
INVENTOR(S) : Francisco Camacho Juarez It is certified that error appears in the above-identified patent and that said Letters Patent is hereby corrected as shown below:

On the title page, after "[22]", change "Filed: May 13, 1997" to –PCT Filed: May 27, 1996—and insert the following:  -- [86] PCT No.:   PCT/ES96/00067
      § 371 Date:   May 13, 1997
      § 102(e) Date:   May 13, 1997
   [87] PCT Pub. No.: WO97/02752
         PCT Pub. Date: Jan. 30, 1997 --.

Signed and Sealed this

Twenty-sixth Day of October, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,863,593
DATED : January 26, 1999
INVENTOR(S) : Francisco Camacho Juarez It is certified that error appears in the above-identified patent and that said Letters Patent is hereby corrected as shown below:

On the Title page, after "[22]", change "filed: May 13, 1997" to --March 27, 1996--and insert --

[86] PCT No.: PCT/ES96/00067
§ 371 Date: May 13, 1997
§ 102(e) Date: May 13, 1997
[87] PCT Pub. No.: WO97/02752
PCT Pub. Date: Jan. 30, 1997 -- --.

This certificate supersedes Certificate of Correction issued October 26, 1999.

Signed and Sealed this

Thirtieth Day of November, 1999

Attest:

Q. TODD DICKINSON

*Attesting Officer*   Acting Commissioner of Patents and Trademarks